Patented July 15, 1947

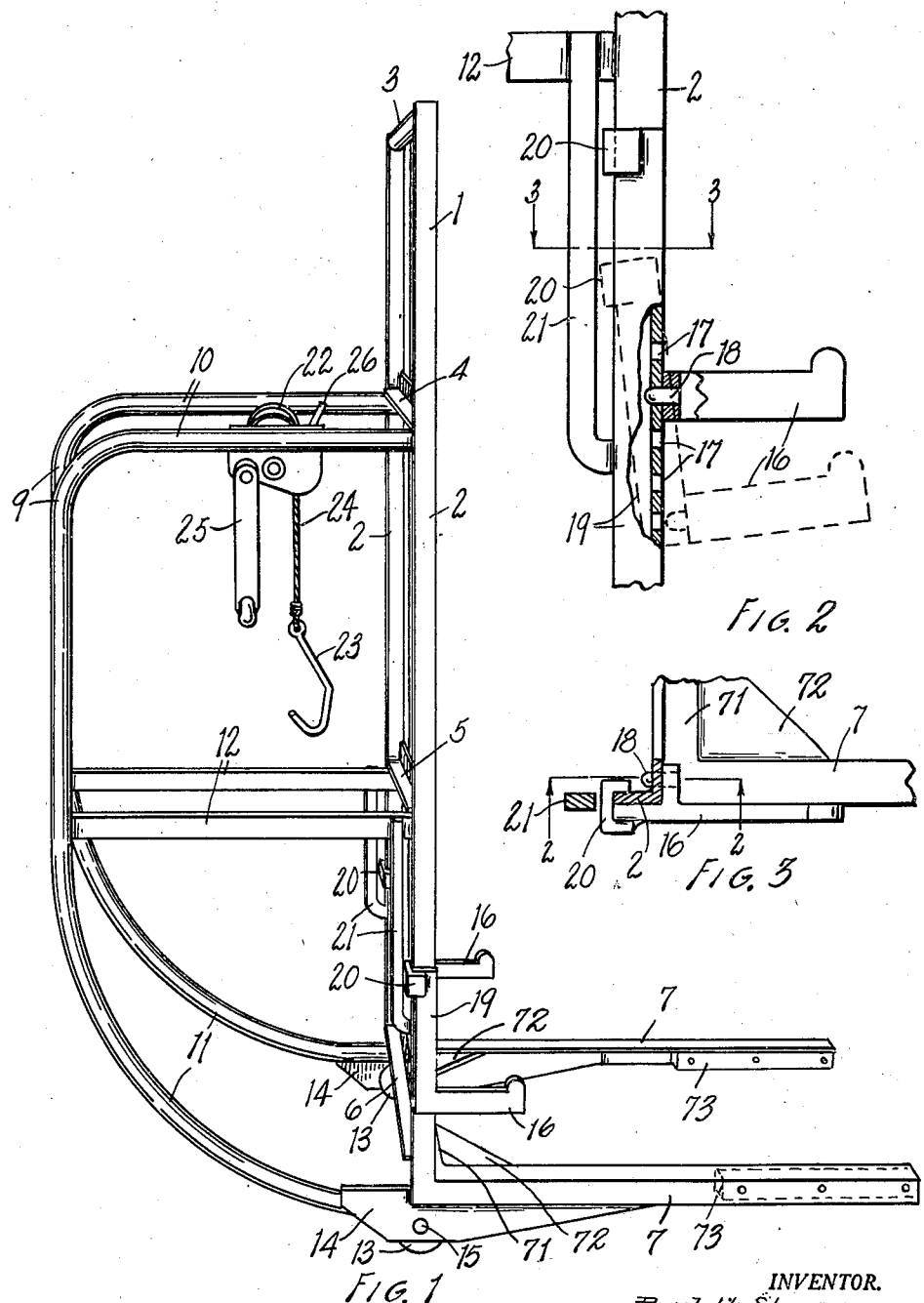

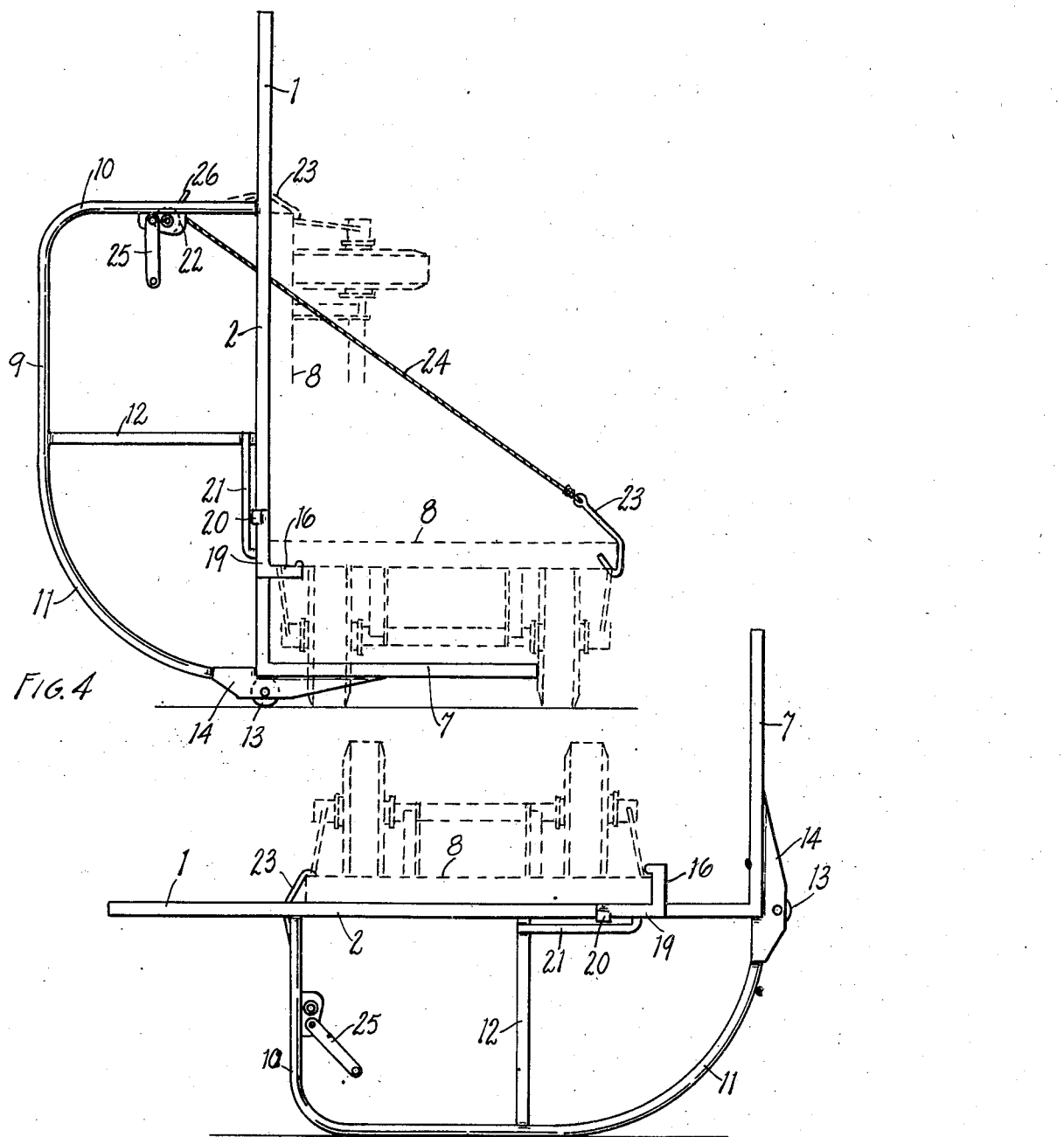

2,424,196

UNITED STATES PATENT OFFICE 2,424,196

APPARATUS FOR HANDLING TRUCKS AND THE LIKE

Paul H. Sleeper, Albion, Mich., assignor to Domestic Industries, Inc., Chicago, Ill., a corporation of Illinois Application October 19, 1944, Serial No. 559,435

14 Claims. (Cl. 214—1)

This invention relates to improvements in apparatus for handling trucks and the like.

The main objects of this invention are:

First, to provide an apparatus for handling trucks such for example as factory, warehouse or railway platform trucks which enables the easy positioning of the truck for servicing such as lubrication and repairs to the running gear.

Second, to provide an apparatus of this character which may be manipulated by one person with relatively little effort and may be moved about from point to point as occasion may require.

Third, to provide a structure having these advantages which may be effectively used for trucks of varying sizes.

Objects relating to details and economies of the invention will appear from the description to follow. The invention is defined and pointed out in the claims.

A preferred embodiment of the invention is illustrated in the accompanying drawings, in which:

Fig. 1 is a perspective view of a structure embodying my invention.

Fig. 2 is an enlarged fragmentary view partially in longitudinal section on line 2—2 of Fig. 3, steps in the manipulation of the truck supporting brackets being indicated by dotted lines.

Fig. 3 is a fragmentary section on line 3—3 of Fig. 2.

Fig. 4 is a side elevation of the structure with the platform in upright position shown in engaged position with a truck indicated by dotted lines.

Fig. 5 is a side view with the platform adjusted to horizontal position, a truck being shown in inverted servicing position by dotted lines.

The tiltable platform, designated generally by the numeral 1 in the embodiment illustrated, comprises side rails 2, 2 formed of angle iron and connected by cross pieces 3, 4, 5 and 6. At one end the platform is provided with forwardly projecting arms 7 constituting a nose piece which may be passed between the wheels of a truck 8, as indicated by dotted lines, or at either side of a wheel where the wheels are arranged centrally of the truck. These arms serve to limit the forward tilting movement of the platform, supporting it in a slightly forwardly tilted upright position. They are preferably weighted at 73 to counterbalance other parts to be described. The arms are provided with braces 71, 72.

The platform is provided with a U-shaped supports 9, the arms of the support constituting legs 10, 10 and 11, 11. Intermediate legs or struts 12 are provided in the structure illustrated. The legs 11 are curved so as to constitute rockers on which the platform may be tilted from upright to horizontal position and vice versa.

Wheels 13 are provided at the end of the platform having the nose piece, these being carried by wheel brackets 14, the wheels being positioned with their journals 15 in alignment with the platform, the wheels being in operating position when the platform is in its upright position.

The supports 9 are preferably formed of pipe or tubing and serve as hand pieces for manipulating the device in transporting, whether it is loaded or unloaded, and also for adjusting it in operative relation to a truck.

Truck supporting brackets 16 are adjustably mounted on the side rails, this adjustability in the embodiment here illustrated being effected by providing the side rails with a longitudinal series of holes 17 adapted to receive the pins 18 on the brackets. The brackets are provided with upwardly projecting arms 19 and with U-shaped clips 20 at the upper ends of the arms engageable with the side rails.

The retaining bars 21 are mounted in spaced relation to the side rails to retain the brackets while permitting their tilting for longitudinal adjustment. This adjustment enables the proper positioning of the brackets to engage the platform of a truck to be serviced.

A cable 24 and winding winch or drum 22 is provided, the cable having a hook 23 at its end engageable with the outer edge of a platform of a truck as shown in Fig. 4. A crank 25 is provided suitably geared to the winch, the gearing not being illustrated. The winch is provided with a lock indicated conventionally at 26.

With the parts thus arranged, the apparatus is positioned relative to a truck by inserting the nose piece 7 between the wheels of a truck, the brackets 16 being adjusted to project under the truck platform. The hook of the cable is engaged with the outer edge of the platform and by turning the winch or winding drum, the truck may be tilted upwardly against the platform, as shown in Fig. 4. In this position, the platform is rocked on its rocker members 11 to horizontal position in which position the truck is supported in inverted position for servicing. After the servicing, the platform is tilted to its upright position and the winch turned in unwinding direction to lower the truck upon its wheels.

In Fig. 4, the truck platform is shown in 90° angular relation to the floor or supporting surface but it will be understood that it is, when unsupported, tilted forwardly, the nose piece limiting this forward tilting. In this position, the unwinding of the drum or winch lowers the truck to its wheels.

I have illustrated and described my invention in a very practical embodiment thereof. I have not attempted to illustrate or describe certain other embodiments or adaptations which I contemplate as it is believed that this disclosure will enable those skilled in the art to embody or adapt my invention as may be desired. The structure as illustrated has a wide range of uses and may be easily manipulated.

Having thus described my invention, what I claim as new and desire to secure by Letters Patent is:

1. In an apparatus for handling trucks and the like, the combination of a tiltable platform comprising side rails and connecting cross pieces, the side rails having a longitudinal series of holes, wheels disposed at one end of said platform and positioned to be operative when the platform is in upright position, a nose piece at the wheeled end of the platform adapted to be introduced under a truck to be handled and to limit the forward tilting of the platform, U-shaped support members for said platform, the arms of said support members at the wheeled end of the platform being curved and constituting rockers facilitating the tilting of the platform from a horizontal to an upright position and vice versa, brackets having pins selectively engageable with said holes in said side rails and having arms disposed on the outer sides of the side rails provided with clips engaging the rear sides of the side rails, retaining bars for said brackets coacting with said clips, a winch mounted on one of said support members, and a cable provided with a hook engageable with a truck whereby a truck may be swung against the platform while the platform is in upright position and the truck supported in inverted position when the platform is adjusted to horizontal position.

2. In an apparatus for handling trucks and the like, the combination of a tiltable platform comprising side rails and connecting cross pieces, the side rails having a longitudinal series of holes, wheels disposed at one end of said platform and positioned to be operative when the platform is in upright position, a nose piece at the wheeled end of the platform adapted to be introduced under a truck to be handled and to limit the forward tilting of the platform, U-shaped support members for said platform, the arms of said support members at the wheeled end of the platform being curved and constituting rockers facilitating the tilting of the platform from a horizontal to an upright position and vice versa, brackets adjustably mounted on said side rails, a winch mounted on one of said support members, and a cable provided with a hook engageable with a truck whereby a truck may be swung against the platform while the platform is in upright position and the truck supported in inverted position when the platform is adjusted to horizontal position.

3. In an apparatus for handling trucks and the like, the combination of a tiltable platform comprising side rails and connecting cross pieces, the side rails having a longitudinal series of holes, wheels disposed at one end of said platform and positioned to be operative when the platform is in upright position, U-shaped support members for said platform, the arms of said support members at the wheeled end of the platform being curved and constituting rockers facilitating the tilting of the platform from a horizontal to an upright position and vice versa, brackets adjustably mounted on said side rails, a winch mounted on one of said support members, and a cable provided with a hook engageable with a truck whereby a truck may be swung against the platform while the platform is in upright position and the truck supported in inverted position when the platform is adjusted to horizontal position.

4. In an apparatus for handling trucks and the like, the combination of a tiltable platform comprising side rails and connecting cross pieces, the side rails having a longitudinal series of holes, wheels disposed at one end of said platform and positioned to be operative when the platform is in upright position, U-shaped support members for said platform, the arms of said support members at the wheeled end of the platform being curved and constituting rockers facilitating the tilting of the platform from a horizontal to an upright position and vice versa, said support members constituting handles for manipulating said platform, the cross piece at the end of the platform remote from the wheels also constituting a hand piece, brackets adjustably mounted on said side rails, a winch mounted on one of said support members, and a cable provided with a hook engageable with a truck whereby a truck may be swung against the platform while the platform is in upright position and the truck supported in inverted position when the platform is adjusted to horizontal position.

5. In an apparatus for handling trucks and the like, the combination of a tiltable platform having a nose piece at one end adapted to be inserted under a truck when the platform is in upright position and to limit the forward tilting movement of the platform, wheels at the nose end of said platform, legs for supporting said platform in horizontal position, one pair of legs being curved to provide rockers on which the truck may be tilted from upright to horizontal position and vice versa, truck engaging brackets adjustably mounted on said platform for adjustment longitudinally thereof, a cable provided with a truck engaging hook, and a winch for said cable whereby a truck may be engaged while in upright position and swung against said platform while the platform is in upright position and supported for servicing with the platform in horizontal position.

6. In an apparatus for handling trucks and the like, the combination of a tiltable platform, legs for supporting said platform in horizontal position, one pair of legs being curved to provide rockers on which the truck may be tilted from upright to horizontal position and vice versa, truck engaging brackets adjustably mounted on said platform for adjustment longitudinally thereof, a cable provided with a truck engaging hook, and a winch for said cable whereby a truck may be engaged while in upright position and swung against said platform while the platform is in upright position and supported for servicing with the platform in horizontal position.

7. In an apparatus for handling trucks and the like, the combination of a tiltable platform having a nose piece at one end adapted to be inserted under a truck when the platform is in upright position and to limit the forward tilting movement of the platform, wheels at the nose end of said platform, rockers on which the truck may be tilted from upright to horizontal position and vice versa, brackets on said platform adapted to be engaged with a truck with the truck in upright position, a cable provided with a truck engaging hook, and a winch for said cable whereby a truck may be engaged while in upright position and swung against said platform while the platform is in upright position and supported for servicing with the platform in horizontal position.

8. In an apparatus for handling trucks and the like, the combination of a tiltable platform, rockers on which the truck may be tilted from upright to horizontal position and vice versa, brackets on said platform adapted to be engaged with a truck with the truck in upright position, a cable provided with a truck engaging hook, and a winch for said cable whereby a truck may be engaged while in upright position and swung against said platform while the platform is in upright position and supported for servicing with the platform in horizontal position.

9. In an apparatus for handling trucks and the like, the combination of a tiltable platform having a forward projection at one end adapted to be inserted under a truck when the platform is in upright position and to limit the forward tilting movement of the platform, wheels at one end of said platform positioned to be effective when the platform is in upright position, legs for supporting said platform in horizontal position, one pair of legs being curved to provide rockers on which the truck may be tilted from upright to horizontal position and vice versa, truck engaging brackets adjustably mounted on said platform for adjustment longitudinally thereof, and a tackle engageable with a truck while it is in upright position for swinging against said platform while the platform is in upright position.

10. In an apparatus for handling trucks and the like, the combination of a tiltable platform, legs for supporting said platform in horizontal position, one pair of legs being curved to provide rockers on which the truck may be tilted from upright to horizontal position and vice versa, truck engaging brackets adjustably mounted on said platform for adjustment longitudinally thereof, and a tackle engageable with a truck while it is in upright position for swinging against said platform while the platform is in upright position.

11. In an apparatus for handling trucks and the like, the combination of a tiltable platform having means for limiting the forward tilting movement of the platform, wheels at one end of said platform positioned to be effective when the platform is in upright position, rockers on which the truck may be tilted from upright to horizontal position and vice versa, brackets on said platform engageable with a truck to support one side thereof for tilting movement, and a tackle engageable with a truck while it is engaged with said brackets for swinging the truck against said platform while the platform is in upright position.

12. In an apparatus for handling trucks and the like, the combination of a tiltable platform having means for limiting the forward tilting movement of the platform, brackets on said platform engageable with a truck to support one side thereof for tilting movement, and a tackle engageable with a truck while it is engaged with said brackets for swinging the truck against said platform while the platform is in upright position.

13. In an apparatus for handling trucks and the like, the combination of a tiltable platform having a nose piece at one end weighted to constitute a counterbalance for parts normally on the platform, legs for supporting said platform in upright position, rockers on which the platform may be tilted from upright to horizontal position and vice versa, work supporting brackets on the side of said platform from which said nose projects and adapted to support a truck or the like for tilting swinging movement, and tackle means engageable with the work while it is engaged with the brackets for swinging the truck against the platform while the platform is in upright position.

14. In a structure for handling trucks and the like, the combination of a platform having a nose at one end thereof adapted to project forwardly from the lower end of the platform when the platform is in upright position and to be inserted under a truck or the like and constituting means limiting the forward tilting movement of the platform when the platform is in upright position, wheels disposed at the nose end of the platform and substantially in the plane thereof and on which the structure may be manipulated when the platform is in approximately upright position, rockers secured to the side of the platform opposite the side from which the said nose projects and on which the platform may be tilted from upright to horizontal position and vice versa, the rockers having curved rocker portions extending rearwardly from said wheels and merging into support portions disposed substantially parallel to the platform and constituting a stable support for the platform when it is in horizontal position, and brackets on said platform engageable with the truck to support one side thereof for tilting movement of the truck upwardly to position its top against said platform while the platform is in an upright position.

PAUL H. SLEEPER.

REFERENCES CITED

The following references are of record in the file of this patent:

UNITED STATES PATENTS

| Number | Name | Date |
|---|---|---|
| 480,095 | Holme | Aug. 2, 1892 |
| 1,048,493 | Catlin | Dec. 31, 1912 |

FOREIGN PATENTS

| Number | Country | Date |
|---|---|---|
| 22,327 | Australia | Sept. 10, 1929 |
| 178,708 | Great Britain | Apr. 27, 1922 |
| 206,403 | Great Britain | Nov. 8, 1923 |
| 580,765 | France | Nov. 15, 1924 |
| 591,364 | Germany | Jan. 20, 1934 |